May 31, 1938.  A. N. SPÁNEL  2,119,495
FORM FOR MAKING RUBBER ARTICLES
Filed June 9, 1934   3 Sheets-Sheet 1
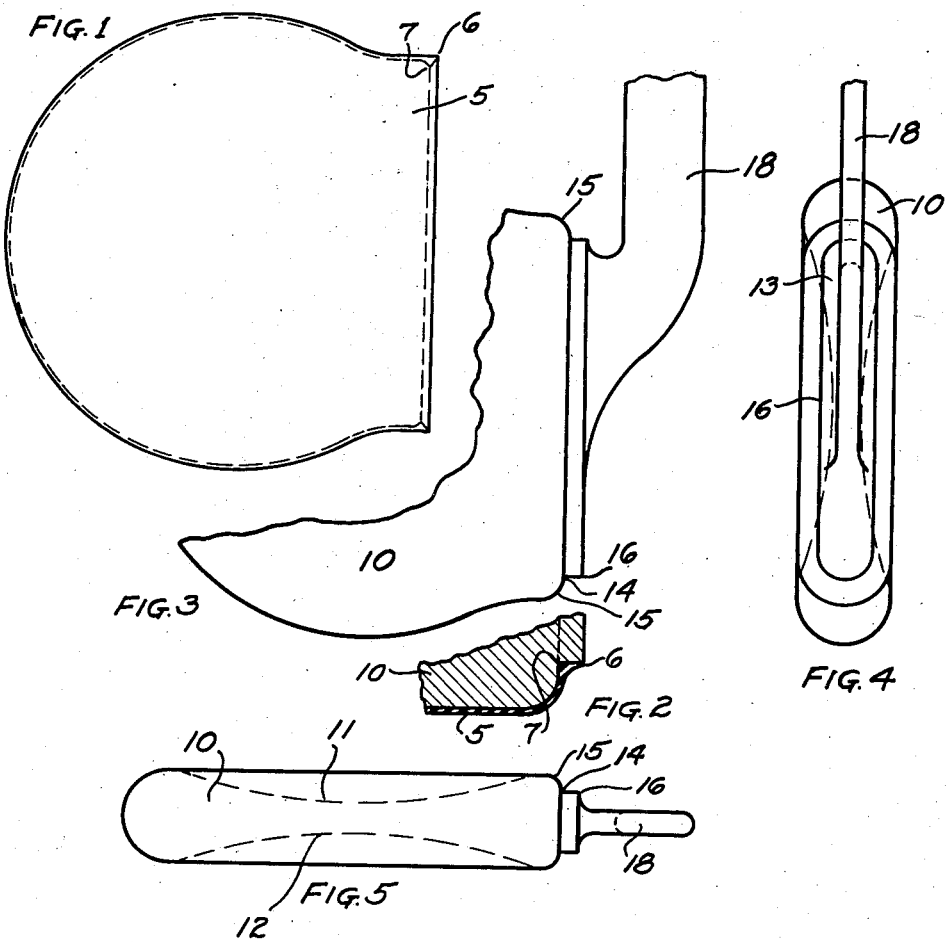
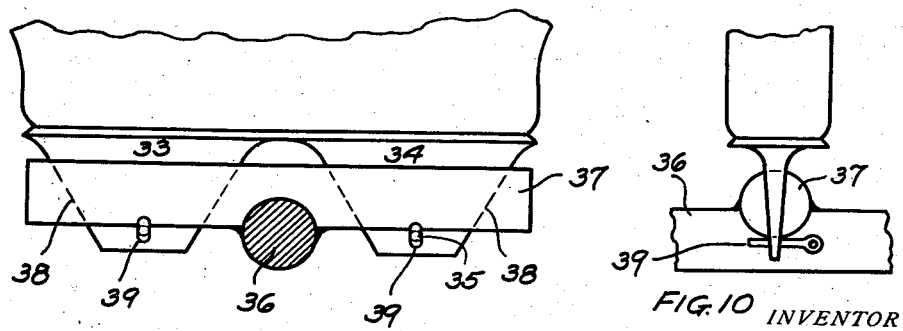
INVENTOR
A. N. SPANEL
BY D. Clyde Jones
ATTORNEY May 31, 1938.  A. N. SPÁNEL  2,119,495
FORM FOR MAKING RUBBER ARTICLES
Filed June 9, 1934    3 Sheets-Sheet 2
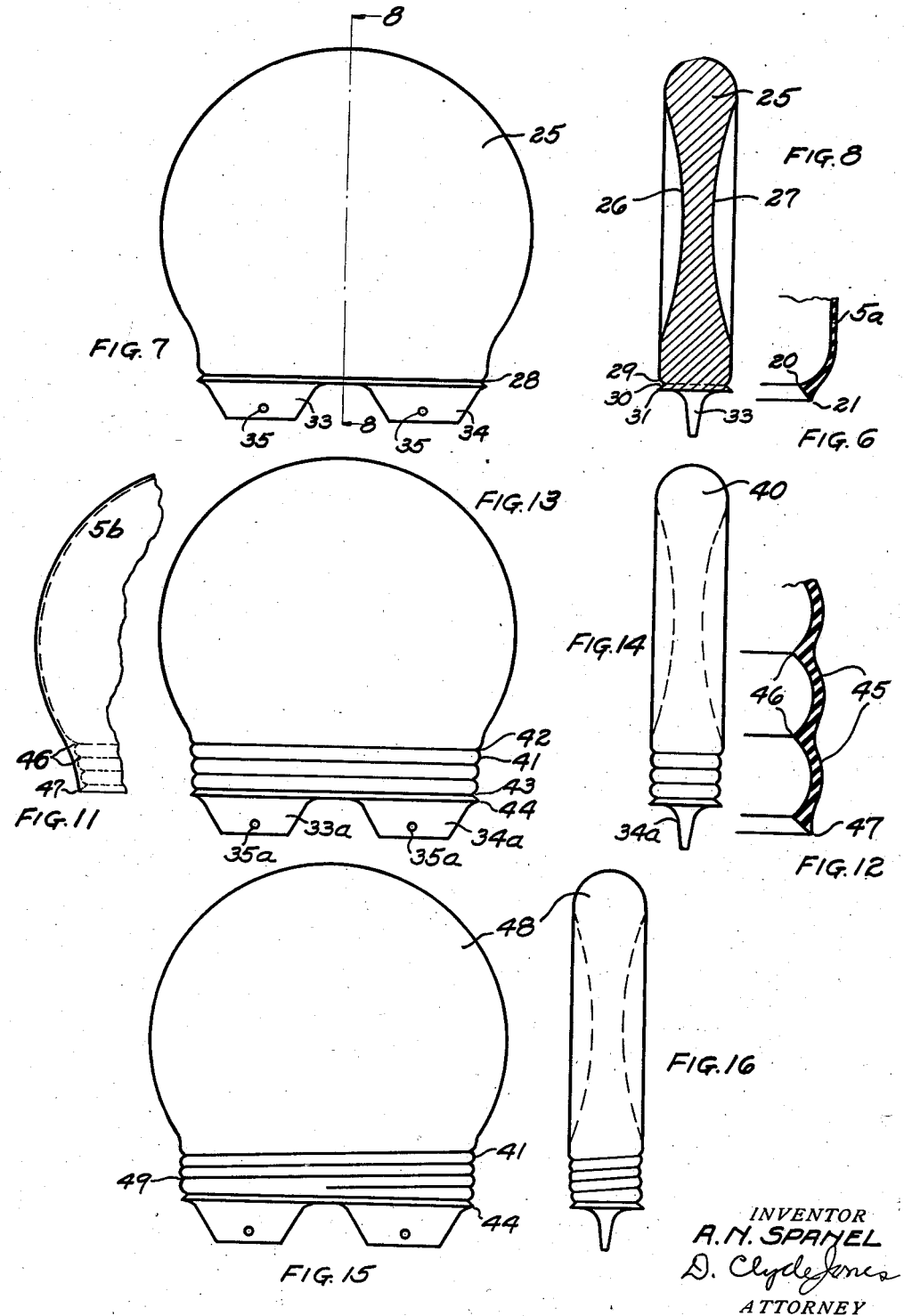
INVENTOR
A. N. SPANEL
D. Clyde Jones
ATTORNEY

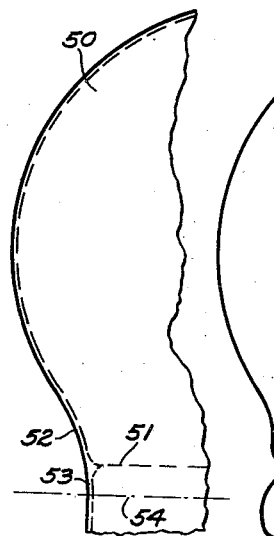
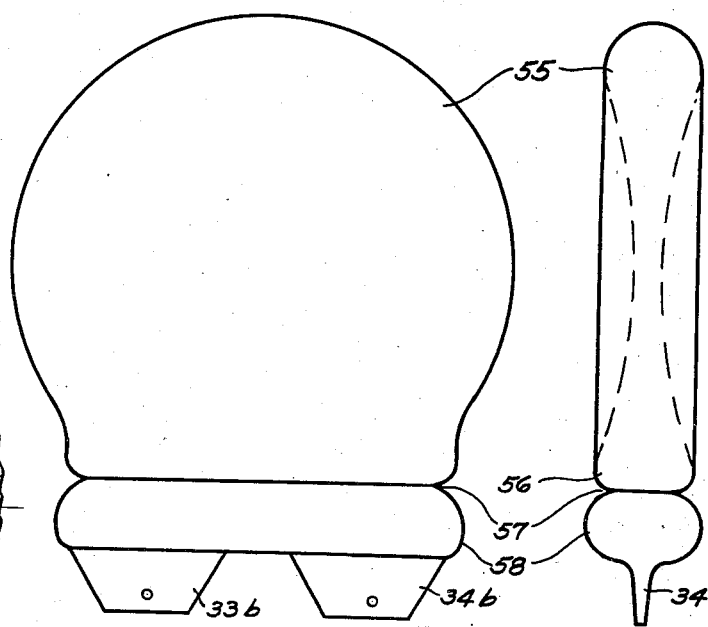
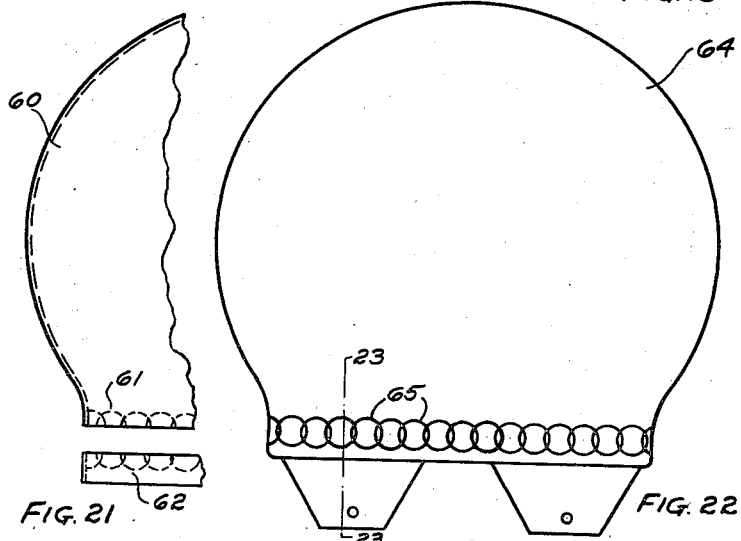
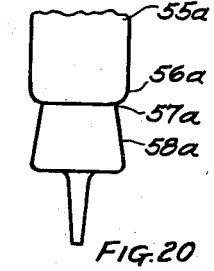
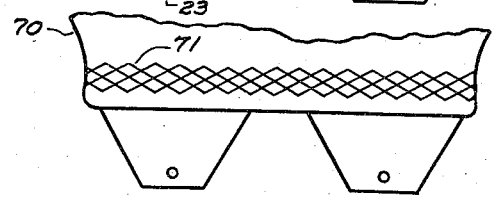

Patented May 31, 1938

2,119,495

UNITED STATES PATENT OFFICE 2,119,495

FORM FOR MAKING RUBBER ARTICLES

Abraham N. Spánel, Rochester, N. Y.

Application June 9, 1934, Serial No. 729,875

11 Claims. (Cl. 18—41)

This invention relates to apparatus for making rubber articles.

It is well known that even a thin rubber article is remarkably strong as long as its edges remain intact but tears easily as soon as an edge is broken. Therefore, in order to provide a sturdy edge for a rubber article, it has been the practice to ring-roll this rubber edge or to cement a suitable reinforcing border thereto. Such methods of reinforcement are not only expensive but they also tend to produce a bulky unsightly product.

The main feature of the present invention relates to an apparatus for making a rubber article having a novel reinforced edge, which reinforcement obviates the need of ring-rolling the edge or cementing a reinforcing border thereon or other similar expensive manufacturing operations.

A further feature of the invention relates to an apparatus for making a bathing cap which has such a construction at the margin of the opening therein that it prevents water from entering between the cap and the head of the wearer.

Another feature of the invention relates to novel apparatus for manufacturing rubber articles with reinforced edges by which apparatus the tendency for the formation of pit or air holes or other irregularities in the reinforced edges is eliminated.

Still another feature of the invention relates to novel forms on which rubber articles of the present invention, can be deposited.

These and other features of the invention will appear from the detailed description and the claims when taken with the drawings, in which Fig. 1 is a front view of an improved bathing cap made according to the present invention; Fig. 2 illustrates an enlarged cross section of a fragment of a form with a fragment of this cap thereon showing the construction of the reinforcement at the margin thereof; Fig. 3 illustrates a fragment of a form on which the cap of Fig. 1 can be deposited; Figs. 4 and 5 are respectively a side view and a bottom view of the form of Fig. 3; Fig. 6 is a cross section of the margin of a modified type of cap; Fig. 7 is a front elevation of a form on which the modified type of cap can be made, and Fig. 8 is a cross section of this form taken substantially on the line 8—8 of Fig. 7; Figs. 9 and 10 are respectively a front view and a side view of a portion of a rack for supporting a plurality of forms, a fragment of one of the forms being mounted thereon; Fig. 11 is a fragment of a still further modified type of bathing cap; Fig. 12 is a greatly enlarged cross section of the margin of this last-mentioned cap; Fig. 13 is a front elevation and Fig. 14 is a side elevation of a form on which the cap illustrated in Figs. 11 and 12 can be deposited; Figs. 15 and 16 are respectively a front elevation and a side elevation of a still further modified type of form on which a bathing cap with a slightly different reinforced border, can be deposited; Fig. 17 is a fragment of a still different type of cap before its excess margin is trimmed away; Fig. 18 is a front elevation and Fig. 19 a side elevation of a form on which the cap of Fig. 17 can be made; Fig. 20 is a fragmentary side elevation indicating how the forms of Figs. 18 and 19 may be slightly changed; Fig. 21 is a fragment of a further modified type of cap showing the excess margin cut away and slightly spaced from the body of the cap; Fig. 22 is a front elevation; Fig. 23 is a fragmentary sectional view taken on the line 23—23 of Fig. 22, and Fig. 24 is a fragment of a front elevation of a form provided with a different pattern of reinforcing ridges from that shown in Fig. 22.

This application is a continuation in part of applicant's copending application, Serial No. 696,037, now matured into Patent No. 2,015,632.

Referring to Fig. 1, 5 generally designates a bathing cap made of ruber and having an opening in its lower end bounded by a torn edge or a feather edge 6. The margin of the cap at this opening as shown in Fig. 2 is reinforced by a thickened angular ridge terminating in the edge 6.

In the manufacture of the rubber cap 5, a form 10 made of aluminum, glass or like material is utilized. The form 10 has the general shape of this bathing cap to be deposited thereon and is provided with depressed sides 11 and 12 as best shown in Fig. 5. The right hand edge of the form as shown in Fig. 4 is provided with a raised panel 13 having the size and contour of the desired opening in the finished cap. This panel rises abruptly from its junction 14 with the main body of the form 10, and its edge 16 is abrupt to define a line of weakness in the deposited layer, while the main body of the form curves at 15 toward the junction 14 so that the deposited layer on the form will not produce a thin or weak area at that portion of the article. The face of the panel 13 is provided with a vertically extending support 18 by which the form may be easily manipulated.

In the making of a rubber bathing cap on this form, the form is dipped one or more times into a bath of an aqueous dispersion of rubber or liquid rubber, until it is completely submerged each time, with an interval for drying between each dip. It is preferred to dip the form with the face of the panel 13 vertical, since by this positioning of the form, there is substantially no opportunity for air to be trapped at the junction 14, which trapped air would form air pockets or bubbles with the result that the thickened ridge would be pitted thereby. While the form is preferably dipped with the junction 14 vertical, it can also be dipped in an inclined position with respect to the surface of the bath and it can be withdrawn from the bath with the junction in a vertical or in an inclined position or it can be removed from the bath with its junction 14 parallel to the horizontal. However, for best results the form should be held with panel 13 in a horizontal position and facing downward as soon as the form is removed from the bath.

When a layer or coating of rubber of the desired thickness has been deposited on the form, and properly dried and vulcanized, the portion of the layer at the face of the panel 13 is removed or torn away as far as the abrupt edge 16. It will be understood that in the course of the dipping operations, the rubber will accumulate by the phenomenon of surface tension in the junction 14 as indicated at 7 in Fig. 2 until it fills the recess between the curved surface 15 of the form and the elevated portion of the panel. After the remainder of the deposited coating is suitably treated, it is removed from the form. The remaining operations of preparing the cap for sale will not be described since they will follow the usual practice.

The bathing cap 5 instead of having a reinforced margin of the character shown in Fig. 2 may be provided, as illustrated by the fragment of the cap 5a of Fig. 6, with a reinforcing ridge 20 projecting from the inside surface of the cap, which ridge tapers to a cut or torn edge 21. This modified cap can be made on the modified type of form 25 disclosed in Figs. 7 and 8 which form differs from that already described, in the arrangement for providing an opening with a reinforced margin in the resulting cap. This form 25 which has the general shape of the modified cap to be deposited thereon is likewise provided with depressed sides 26 and 27 while the lower end of the form, as illustrated, is provided with a substantially V-shaped notch 28. The surface of the main body of the form is purposedly curved, as indicated at 29, to the bottom of the notch while the other lateral wall 30 of this notch terminates in an abrupt edge 31. This form is also provided with fins 33 and 34 having the key-receiving openings 35 therein.

As shown in Figs. 9 and 10, these fins are adapted to be held in a dipping frame which comprises a longitudinal rod 36 having the cross rods 37 welded thereto in spaced relation. Each rod 37 is provided with a pair of V-shaped slots 38 each of which is open at one end for convenience in manufacturing. These slots receive the fins 33 and 34 on the form, and yet permit the fins to project through the rods 37 a sufficient distance so that keys 39 can be inserted through the openings 35 to engage the under surface of the rods and thereby lock the forms on the rack.

A further modified type of reinforced cap 5b is disclosed in the fragmentary views of Figs. 11 and 12. In this cap the margin of the rubber layer around the opening therein has a series of parallel flutings 45 on the outside surface of the layer and the inner surface has projecting therefrom a series of thickened parallel ridges 46. This cap at its opening, terminates in a tapered, torn or cut edge 47.

The modified cap 5b can be made on the form 40 shown in Figs. 13 and 14. This form has the general shape of the desired bathing cap to be deposited thereon and near its lower edge it is provided with a plurality of purposely curved parallel reeds 41 separated by substantially V-shaped valleys or recesses 42 while the lowermost recess 43 terminates in an abrupt edge 44. The lower portion of this form is provided with fins 33a and 34a, similar to those shown in Fig. 7 and is likewise provided with key-receiving openings 35a therein for retaining the forms in a rack.

In making a cap on this form, the form is dipped one or more times into a bath of an aqueous dispersion of rubber or any suitable rubber solution, with the parallel reeds 41 extending vertically or inclined to the surface of the bath while the form is being dipped into the bath. Altho the form may be removed from the bath with the reeds extending vertically or inclined, after which it will be turned so that these reeds extend horizontally, the form may be turned while in the bath so that it can be removed therefrom with the reeds substantially parallel with the surface of the bath. The form after having thus been dipped several times with a drying interval intervening between each dip, is permitted to dry and cure after which the excess rubber layer as far as the abrupt edge 44 is torn or cut away. Then the remainder of the layer of the cap is stripped from the form and prepared in accordance with the usual practice.

A further modified cap similar to that shown in Figs. 11 and 12 but differing therefrom by having the parallel ridges 46 defined by a spiral groove, can be made on the form 48 disclosed in Figs. 15 and 16. This last-mentioned form is similar to that shown in Figs. 13 and 14 but differs therefrom in that the parallel curved reeds 41 instead of extending parallel to the edge 44, are arranged spirally on the lower surface of the form, being defined by the spiral groove 49. Otherwise these two types of forms may be identical. The method of making caps on this form is similar to that already described and need not be repeated.

A further modified type of dipped cap 50 is shown in Fig. 17, which cap is provided with a ridge 51 extending around the border of the cap at the opening therein. It will be noted that the wall portions 52 and 53 of the cap at each side of the ridge 51 are of substantially equal thickness. While the cap may be marketed in the form in which it is shown in Fig. 17, it is preferred to trim away a portion of the border preferably by cutting along the broken line 54.

The cap illustrated in Fig. 17 can be made on the form 55 (shown in Figs. 18 and 19), which is provided with a recess 57 encircling the lower portion of the form. This recess is defined by the intersecting curved surfaces 56 of the body of the form and 58 at the lower extension of the form. While this form may be supported in any convenient manner, it is herein illustrated as provided at its lower edge with fins 33b and 34b so that it can be mounted in a suitable rack as indicated in Figs. 9 and 10.

In the making of a cap on this form, the form is dipped one or more times into a bath of an aqueous dispersion of rubber or rubber solution with a drying interval between each dip, as described above. It will be understood that a uniform layer of rubber is deposited over the surface of the form, except that in the recess 57 a thickened accumulation or ridge 51 is deposited. When the cap has been properly dried, the excess border is cut away along the broken line 54 either before or after the cap is removed from the form.

The form shown in Figs. 18 and 19 may be slightly modified by having the recess 57a therein defined by the intersection of a curved surface 56a and the plane surface 58a. Otherwise this form and the method of making a cap thereon, are the same as that first described.

In Fig. 17 the cap is illustrated as having its excess margin cut away at a point somewhat removed from the reinforcing ridge 51, while in Fig. 21 the cap 60 is shown with an integral reinforcing pattern of ridges 61 extending around the cap at its margin. In this instance the excess margin 62 is trimmed away by cutting through the reinforcing pattern of ridges 61. Although this pattern has been herein disclosed as formed by the intersection of a series of circles, it may be composed of triangles, rectangles, or innumerable other figures.

The cap 60 can be made on the form 64 shown in Figs. 22 and 23, which is provided along its lower margin as illustrated, with a pattern of recesses 65 herein shown as intersecting circular recesses. The remainder of the form is similar to that already described. In the making of a cap on this form, the operations set forth earlier are followed until the cap is properly dried and removed from the form. Thereafter, the cap is cut through the reinforcing pattern 61 as shown in Fig. 21.

In Fig. 24 the form 70 is shown provided with a slightly different pattern of reinforcing recesses 71 so that the margin or border of the resulting cap at the head opening, will have a somewhat different pattern of reinforcing ridges.

It will be appreciated that in the steps described for making rubber articles by this method, the edge of the article may be trimmed by tearing or by cutting, whichever is deemed more expedient.

While the invention has been described in connection with rubber bathing caps, it will be understood that it is equally applicable to rubber gloves, finger cots or any other rubber article having one or more openings therein, with a reinforced margin or margins of the article around the opening or openings.

What I claim is:

1. A form on which rubber or the like may be deposited for making a cap or the like with an opening therein having a reinforced margin, said form being provided adjacent one edge with a recess therein defined by a curved surface of said form intersected by a plane surface thereof, said curved surface being free from any projecting abrupt edge.

2. A form on which rubber or the like may be deposited for making a cap or the like with an opening therein having a reinforced margin, said form being provided adjacent one edge with a recess therein defined by two intersecting curved surfaces merging gradually with the exposed surfaces of the form.

3. A form on which rubber or the like may be deposited for making a cap or the like with an opening therein having a reinforced margin, said form near one edge being provided with a series of reeds with intervening recesses, the projecting portions of a plurality of said reeds being free from abrupt edges.

4. A form on which rubber or the like may be deposited for making a cap or the like with an opening therein having a reinforcing margin, said form having an abrupt edge and being provided adjacent said edge with a series of parallel reeds with intervening recesses, and the projecting portions of said reeds being free from any abrupt edge.

5. A form on which rubber or the like may be deposited for making a cap or the like with an opening therein having a reinforced margin said form near one end being provided with a pattern of recesses free from abrupt projecting corners and extending around the form.

6. A form on which rubber or the like may be deposited for making a cap with an opening therein having a reinforced margin, said form adjacent one edge being provided with parallel reeds defined by a spiral groove extending substantially around the form, the projecting portions of said reeds being free from abrupt edges.

7. A form on which rubber or the like may be deposited for making a rubber article such as a cap or the like with an opening therein having a reinforced margin, said form being provided with an abrupt edge to define said opening and said form having therein adjacent said edge, a recess defined by a curved surface of said form intersected by a surface of the form, said curved surface being free from any projecting abrupt edge and said other surface extending from said intersection to the abrupt edge of the form.

8. A form on which rubber or the like may be deposited for making a cap or the like with an opening therein having a reinforced margin, said form being provided with an abrupt edge to define said opening and said form having therein adjacent said edge, a recess defined by a curved surface of said form intersected by a plane surface thereof, said curved surface being free from any projecting abrupt edge and said plane surface extending from said intersection to the abrupt edge of the form.

9. A form on which rubber or the like may be deposited for making a cap or similar article with an opening therein and having a reinforced margin at said opening, said form being provided with a reinforcement-generating recess therein adjacent the margin-generating portion thereof, the surface of said recess merging gradually with the article generating surface of the form.

10. A form on which rubber or the like may be deposited for making a cap or similar article with an opening therein and having a reinforced margin adjacent said opening, said form being provided with a reinforcement-generating recess therein adjacent the margin-generating portion thereof, the surface of said recess merging gradually with the article-generating surface of the form at each side of the recess.

11. A form for making a seamless, deposited rubber article, said form comprising a relatively flattened member having the general outline of the article to be deposited thereon, said member having a rounded edge, said rounded edge having a plurality of spaced reinforcement-generating grooves formed therein, said grooves extending substantially across said edge, the surface of each groove blending into a main surface of said member.

ABRAHAM N. SPÁNEL.